(12) United States Patent
Peeters et al.

(10) Patent No.: US 8,009,697 B2
(45) Date of Patent: Aug. 30, 2011

(54) METHOD AND APPARATUS FOR SEGMENTATION OF MESSAGES IN A COMMUNICATIONS SYSTEM

(75) Inventors: Miguel Peeters, Mechelen (BE); Dimitri Saey, Mechelen (BE); Ruben Lysens, Mechelen (BE)

(73) Assignee: Broadcom Corporation, Irvine, CA (US)

( * ) Notice: Subject to any disclaimer, the term of this patent is extended or adjusted under 35 U.S.C. 154(b) by 881 days.

(21) Appl. No.: 10/849,870

(22) Filed: May 21, 2004

(65) Prior Publication Data

US 2005/0008038 A1    Jan. 13, 2005

Related U.S. Application Data

(60) Provisional application No. 60/484,698, filed on Jul. 7, 2003, provisional application No. 60/495,875, filed on Aug. 19, 2003.

(51) Int. Cl.
*H04J 3/24*    (2006.01)

(52) U.S. Cl. .................................. 370/474; 370/473
(58) Field of Classification Search ........... 370/469–474
See application file for complete search history.

(56) References Cited

U.S. PATENT DOCUMENTS

| | | | |
|---|---|---|---|
| 6,922,401 B1 * | 7/2005 | Dirschedl et al. | 370/278 |
| 6,961,326 B1 * | 11/2005 | Chang et al. | 370/338 |
| 7,142,565 B2 * | 11/2006 | Casaccia et al. | 370/474 |
| 7,224,703 B2 * | 5/2007 | Antal et al. | 370/473 |
| 2002/0041592 A1 * | 4/2002 | Van Der Zee et al. | 370/389 |
| 2002/0136217 A1 * | 9/2002 | Christensen | 370/393 |
| 2002/0178311 A1 * | 11/2002 | Liu et al. | 710/240 |

* cited by examiner

*Primary Examiner* — Huy D Vu
*Assistant Examiner* — Dady Chery
(74) *Attorney, Agent, or Firm* — Sterne, Kessler, Goldstein & Fox, P.L.L.C.

(57) ABSTRACT

Method for transmitting messages in a communications system, wherein the message is segmented into a plurality of message segments, the message segments being of variable length, the plurality of message segments comprising at least one leading message segment and a trailing message segment, and a message segment indication is applied to the at least one leading message segment.

34 Claims, 1 Drawing Sheet

METHOD AND APPARATUS FOR SEGMENTATION OF MESSAGES IN A COMMUNICATIONS SYSTEM

CROSS-REFERENCE TO RELATED APPLICATIONS

This application claims the benefit of U.S. Provisional Application No. 60/484,698, filed Jul. 7, 2003 and U.S. Provisional Application No. 60/495,875, filed Aug. 19, 2003, the contents of which are hereby incorporated by reference.

FIELD OF THE INVENTION

The present invention relates to communications systems. More particular the invention relates to the segmentation and transmission of messages in communications systems.

BACKGROUND OF THE INVENTION

The transmission of messages in communications systems is subject to timeouts, i.e. each message is required to be sent during a specified time interval. Timeouts are based on the time interval starting from the last octet of a requested message sent to the last octet of a response message received. Different timeouts are specified according to the priority of the messages. The priority of the message is determined according to the time sensibility on the transmission of the message. An example of such a protocol with up to 3 priorities is specified in the Recommendation ITU-T G.992.3. This protocol defines timeouts of 400, 800, and 1000 ms for priorities 1, 2, and 3 respectively. Messages with lower priority value have precedence over messages with higher priority value, e.g. a message with priority 1 has precedence over a message with priority 2 and a message with priority 2 has priority over a message with priority 3.

However this protocol does not permit to transmit messages requiring a transmission time which is longer than the timeout or to transmit messages which are longer than the maximal packet size. This problem has also been discussed in the Contribution DC-023 presented to the ITU-Telecommunication Standardization Sector, Study Group 15.

What is needed therefore is to provide a message protocol that allows long messages to be transmitted in communications systems wherein message durations and/or message lengths are restricted.

SUMMARY OF THE INVENTION

Aspects of the present invention may be found in, for example, apparatuses and methods that segment messages in a communications system. In one embodiment according to the invention a method for transmitting messages in a communications system comprises segmenting a message into a plurality of message segments, the message segments being of variable length, the plurality of message segments comprising at least one leading message segment and a trailing message segment, and applying a message segment indication to the at least one leading message segment. In the method the length of the message segments may further be limited to 1024 bytes or octets.

The method may also comprise returning an acknowledging message upon receipt of the at least one leading message segment. In the method each acknowledgement may comprise an indication of the number of message segments received in order. In the method the acknowledgement may further comprise parts of the transmitted message. In the method the parts of the transmitted message in the acknowledgement may further comprise an indication of a message designator and a message type.

In the method according to one embodiment of the invention wherein one of a plurality of priorities may be assigned to the message, wherein messages with low priorities have precedence over messages with high priorities, and wherein a size of the message segments may be determined according to the priority of the transmitted message. In the method a timeout according to the priority may be assigned to the message. Preferably the timeout may determine the time interval between the last byte of a first message sent and the last byte of a first message segment received in response to the first message, or the time interval between the last byte of a second message segment sent and the last byte of a second message received in response to the second message segment. The size of the message segments may be determined such that each message segment can be transmitted within the timeout or in an essentially shorter time interval.

In the method the size of the message segments may be determined to decrease with increasing priority. In the method an upper limit of the size of the message segments may be determined to decrease with increasing priority.

According to another aspect of the present invention an apparatus for transmitting messages in a communications system is provided, the apparatus comprising first means for segmenting a message into a plurality of message segments, the message segments being of variable length, the plurality of message segments comprising at least one leading message segment and a trailing message segment, and second means for applying a message segment indication to the at least one leading message segment. In the apparatus the length of the message segments may be limited to 1024 bytes or octets.

The apparatus may further comprise a third means for returning an acknowledging message upon receipt of the at least one leading message segment. In the apparatus each acknowledgement may comprise an indication of the number of message segments received in order. In the apparatus the acknowledgement may further comprise parts of the transmitted message. In the apparatus the parts of the transmitted message in the acknowledgement may comprise an indication of a message designator and a message type.

The apparatus may further comprise a fourth means for assigning one of a plurality of priorities to the message, wherein messages with low priorities have precedence over messages with high priorities, and a fifth means for determining a size of the message segments according to the priority of the transmitted message. The apparatus may further comprise a sixth means for assigning a timeout to the message according to the priority. Preferably the timeout may determine the time interval between the last byte of a first message sent and the last byte of a first message segment received in response to the first message, or the time interval between the last byte of a second message segment sent and the last byte of a second message received in response to the second message segment, and the size of the message segments may be determinable by the fifth means such that each message segment can be transmitted within the timeout or in an essentially shorter time interval. In the apparatus the size of the message segments may be determinable by the fifth means to decrease with increasing priority. In the apparatus an upper limit of the size of the message segments may be determinable by the fifth means to decrease with increasing priority.

In yet another embodiment according to the invention a computer-readable media embodying a sequence of instructions executable by a computer is provided to perform a method of converting messages, the method comprising segmenting a message into a plurality of message segments, the message segments being of variable length, the plurality of message segments comprising at least one leading message segment and a trailing message segment, and applying a message segment indication to the at least one leading message segment. The method in the computer-readable media may be further characterized in that the length of the message segments is limited to 1024 bytes or octets.

The method in the computer-readable media may further comprise returning an acknowledging message upon receipt of the at least one leading message segment. The method in the computer-readable media may be further characterized in that each acknowledgement comprises an indication of the number of message segments received in order. The method in the computer-readable media may be further characterized in that the acknowledgement further comprises parts of the transmitted message. The method in the computer-readable media may be further characterized in that the parts of the transmitted message in the acknowledgement comprise an indication of a message designator and a message type. The method in the computer-readable media may be further characterized in that one of a plurality of priorities is assigned to the message, and messages with low priorities have precedence over messages with high priorities, and wherein a size of the message segments is determined according to the priority of the transmitted message.

The method in the computer-readable media may be further characterized in that a timeout according to the priority is assigned to the message. Preferably the timeout may determine the time interval between the last byte of a first message sent and the last byte of a first message segment received in response to the first message, or the time interval between the last byte of a second message segment sent and the last byte of a second message received in response to the second message segment, and the size of the message segments may be determined such that each message segment can be transmitted within the timeout or in an essentially shorter time interval. The method in the computer-readable media may be further characterized in that the size of the message segments is determined to decrease with increasing priority. The method in the computer-readable media may be further characterized in that an upper limit of the size of the message segments is determined to decrease with increasing priority.

In still another embodiment according to the invention a message signal embodied in a signal carrier is provided, the message signal comprising a plurality of message signal segments, the message signal segments being of variable length, the plurality of message signal segments comprising at least one leading message signal segment and a trailing message signal segment, wherein the at least one leading message signal segment comprises a message signal segment indication.

Further embodiments, features and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated in and constitute a part of the specification, illustrate an embodiment of the invention and, together with the description, explain the purpose, advantages, and principles of the invention.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the present invention. Therefore, the following detailed description is not meant to limit the invention. Rather, the scope of the invention is defined by the appended claims.

It would be apparent to one of skill in the art that the present invention, as described below, may be implemented in many different embodiments of hardware, software and/or, firmware. Any actual software code with specialized control hardware to implement the present invention is not limiting of the present invention. Thus, the operation and behaviour of the present invention will be described with the understanding that modifications and variations of the embodiments are possible, given the level of detail presented herein.

In the ITU-T G.992.3 Recommendation, long messages can be transmitted through a low capacity channel. However, some messages cannot be transmitted in the timeout specified in the recommendation because the transmission time of the message is longer than the timeout. The present invention proposes to divide the whole message in smaller segments that can be transmitted while meeting the timeouts. This means that the duration to transmit one segment should be significantly smaller than the timeouts.

The duration of the timeouts may be kept equal to the duration of the priority associated with a message. In one embodiment of the invention the timeouts may be determined based on the transmission of a message segment.

In a communications system according to the ITU-T G.992.3 Recommendation Overhead Messaging protocol, for instance, all message segments except the last message segment according to the invention may be built as follows:
  the message segment length is variable length with a maximal length of 1024 bytes or octets. The segment length shall be chosen in order to meet the timeouts,
  the high level data link control (HDLC) field has one bit indicating that it carries a message segment.

Each message segment may be acknowledged upon receipt, except the last message segment. The following may also apply to the acknowledgement messages to all message segments:
  the message length is 3 bytes or octets.
  the message is either a command message (request to continue the response, e.g., L2 grant) or a response message (request to continue the command, e.g., OLR).
  the first 2 bytes or octets equal to the first 2 octets of the segmented message (message designator and message type), followed by an octet representing the number of message segments received in order by the far-end.

Figure 1A:
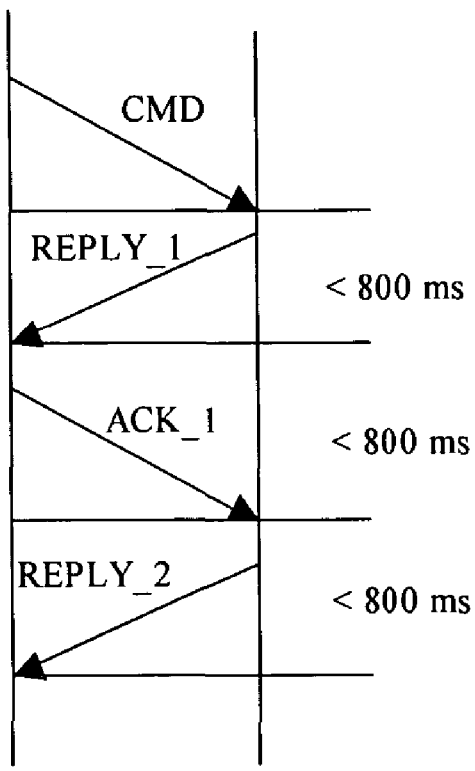
FIGS. 1a-b are exemplary timing charts for the segmentation of a reply message and a command message, respectively.

FIG. 1a shows an example of a message that may be transmitted according to an embodiment of a method according to the invention.

After a command message (CMD) may have been sent, a first segment (REPLY_1) may be returned in response to the command within the duration of a timeout of 800 msec that may have been determined for the reply.

A second timeout may endure between the last byte of the first message segment (REPLY_1) may have been sent and the last byte of an acknowledgement (ACK_1) may have been received in return to the first message segment (REPLY_1).

The second segment (REPLY_2) of a message that might have been split into two segments may follow the first segment (REPLY_1) and the last byte of said second message segment (REPLY_2) may have been received within the duration of a timeout of another 800 msec after an acknowledgement in return of said first message segment (REPLY_1) may have been sent.

Figure 1B:
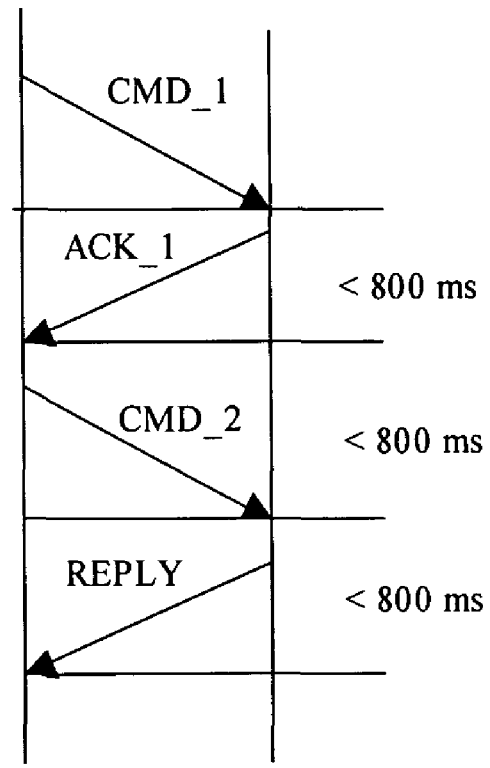

FIG. 1b shows an example of a command that may be transmitted according to an embodiment of a method according to the invention.

After a first command message segment (CMD_1) may have been sent, an acknowledgement (ACK_1) may be returned in response to the first command message segment within the duration of a timeout of 800 msec that may have been determined for the command message.

The second command message segment (CMD_2) of a command message that might have been split into two message segments may follow the first segment (CMD_1) and the last byte of said second command message segment (CMD_2) may have been received within the duration of a timeout of another 800 msec after the acknowledgement (ACK_1) may have been sent in return of said first command message segment (CMD_1). Note that the second and last command message segment may not be acknowledged.

A third timeout may endure between the last byte of the second command message segment (CMD_2) may have been sent and the last byte of a reply (REPLY) may have been received in return to the combined command message segments (CMD_1 and CMD_2).

If a segment of a segmented message is aborted by a higher priority message, the transmitter may retransmit only the aborted segment and continue to transmit the remaining segments if any.

In one embodiment of the invention the message segment sizes may be determined to be fixed for each priority under the constraint that the timeout can be met. An example of such fixed segment size for the ITU-T G.992.3 Recommendation protocol is:

| Priority | Fixed Segment Size | Transmit duration on 4 kbps channel | Timeout of the priority |
| --- | --- | --- | --- |
| 1 | 100 bytes | 200 ms | 400 ms |
| 2 | 300 bytes | 600 ms | 800 ms |
| 3 | 600 bytes | 800 ms | 1000 ms |

The segment sizes may be computed in order to keep a fixed duration of 200 ms for possible computation, for instance.

Another possibility may be to determine the segment sizes to be fixed for each priority but choose smaller segment sizes for messages with high priority value or to choose the same segment size for all priorities. This choice would allow more fluidity on the transmission because the ITU-T G.992.3 Recommendation protocol allows aborting the transmission of a message with high priority value in the event that there is a request to transmit a message with a lower priority value. Therefore it may be advantageous to divide messages into smaller pieces but with longer timeout.

In other words, to avoid starvation of the protocol, it may be desirable to reduce the transmit duration of a segment to a value significantly shorter than the timeout of the highest priority message, as can be seen in the following table:

| Priority | Fixed Segment Size | Transmit duration on 4 kbps channel | Timeout of the priority |
| --- | --- | --- | --- |
| 1 | 100 bytes | 200 ms | 400 ms |
| 2 | 75 bytes | 150 ms | 800 ms |
| 3 | 50 bytes | 100 ms | 1000 ms |

Still another possibility to achieve higher flexibility on the transmission may be to allow for flexible segment size but to define a different maximal segment size for each priority and to choose the maximal segment size to decrease with an increasing priority value. An example is given in the following table:

| Priority | Maximal Segment Size | Transmit duration on 4 kbps channel | Timeout of the priority |
| --- | --- | --- | --- |
| 1 | 100 bytes | 200 ms | 400 ms |
| 2 | 75 bytes | 150 ms | 800 ms |
| 3 | 50 bytes | 100 ms | 1000 ms |

The foregoing description of the preferred embodiments provides an illustration and description, but is not intended to be exhaustive or to limit the invention to the precise form disclosed. Modifications and variations are possible consistent with the above teachings, or may be acquired from practice of the invention.

What is claimed is:

1. A method for transmitting messages in an electronic communications system, the method comprising:
   segmenting a message into a plurality of message segments, the plurality of message segments comprising at least one leading message segment and a trailing message segment;
   applying a message segment indication to the at least one leading message segment;
   assigning one of a plurality of timeout values to the message;
   determining the length of the message segments according to the timeout value of the message such that the message segments have a segment length that decreases with an increasing timeout value of the message; and
   transmitting the message segments over the electronic communications system.

2. The method according to claim 1,
   wherein the length of each of the plurality of message segments is limited to a maximal segment length of 1024 bytes or octets.

3. The method according to claim 1,
   further comprising receiving an acknowledgment message upon receipt of the at least one leading message segment at a destination device.

4. The method according to claim 3,
   wherein the acknowledgement message comprises an indication of the number of message segments received in order.

5. The method according to claim 3,
   wherein the acknowledgement message comprises parts of the transmitted message.

6. The method according to claim 5,
   wherein the parts of the transmitted message in the acknowledgement message comprise an indication of a message designator and a message type.

7. The method according to claim 1,
wherein each of the plurality of timeouts is associated with a priority value; and
wherein a message with a timeout value having a lower priority value has precedence over a message with a timeout value having a higher priority value.

8. The method of claim 1,
wherein the length of each of the plurality of message segments is determined such that each message segment can be transmitted in a time interval which is essentially shorter than the timeout value of the message.

9. The method of claim 1,
wherein the communications system is an asymmetric digital subscriber line (ADSL) communications system.

10. The method of claim 1, wherein the length of each of the plurality of message segments is limited to a maximal segment length that decreases with an increasing timeout value.

11. The method of claim 1, wherein the timeout value determines a maximum time interval available for transmission of each message segment.

12. An apparatus for transmitting messages in a communications system, the apparatus comprising:
first means for segmenting a message into a plurality of message segments, the plurality of message segments comprising at least one leading message segment and a trailing message segment;
second means for applying a message segment indication to the at least one leading message segment;
third means for assigning one of a plurality of timeout values to the message; and
fourth means for determining the length of the message segments according to the timeout value of the message such that the message segments have a segment length that decreases with an increasing timeout value of the message.

13. The apparatus according to claim 12,
wherein the length of each of the plurality of message segments is limited to a maximal segment length of 1024 bytes or octets.

14. The apparatus according to claim 12,
further comprising a fifth means for receiving an acknowledgment message upon receipt of the at least one leading message segment at a destination device.

15. The apparatus according to claim 14,
wherein the acknowledgement message comprises an indication of the number of message segments received in order.

16. The apparatus according to claim 14,
wherein the acknowledgement message comprises parts of the transmitted message.

17. The apparatus according to claim 16,
wherein the parts of the transmitted message in the acknowledgement message comprise an indication of a message designator and a message type.

18. The apparatus according to claim 12,
wherein each of the plurality of timeouts is associated with a priority value; and
wherein a message with a timeout value having a lower priority value has precedence over a message with a timeout value having a higher priority value.

19. The apparatus of claim 18,
further comprising a sixth means for assigning the timeout to the message according to the priority value, and
wherein the length of each of the plurality of message segments is determined such that each message segment can be transmitted in a time interval which is essentially shorter than the timeout value of the message.

20. The apparatus of claim 12,
wherein the communications system is an asymmetric digital subscriber line (ADSL) communications system.

21. The apparatus of claim 12, wherein the length of each of the plurality of message segments is limited to a maximal segment length that decreases with an increasing timeout value.

22. The apparatus of claim 12, wherein the timeout value determines a maximum time interval available for transmission of each message segment.

23. A non-transitory computer-readable storage media embodying a sequence of instructions executable by a computer to perform a method of converting messages, the method comprising:
segmenting a message into a plurality of message segments, the plurality of message segments comprising at least one leading message segment and a trailing message segment;
applying a message segment indication to the at least one leading message segment;
assigning one of a plurality of timeout values to the message; and
determining the length of the message segments according to the timeout value of the message, —so such that the message segments have a segment length that decreases with an increasing timeout value of the message.

24. The non-transitory computer-readable media of claim 23, wherein the length of each of the plurality of message segments is limited to a maximal segment length of 1024 bytes or octets.

25. The non-transitory computer-readable media of claim 23, wherein the method further comprises receiving an acknowledgment message upon receipt of the at least one leading message segment at a destination device.

26. The non-transitory computer-readable media of claim 25, wherein the acknowledgement message comprises an indication of the number of message segments received in order.

27. The non-transitory computer-readable media of claim 25, wherein the acknowledgement message further comprises parts of the transmitted message.

28. The non-transitory computer-readable media of claim 27, wherein the parts of the transmitted message in the acknowledgement message comprise an indication of a message designator and a message type.

29. The non-transitory computer-readable media of claim 23, wherein each of the plurality of timeouts is associated with a priority value; and
wherein a message with a timeout value having a lower priority value has precedence over a message with a timeout value having a higher priority value.

30. The non-transitory computer-readable media of claim 29, wherein the length of each of the plurality of message segments is determined such that each message segment can be transmitted in a time interval which is essentially shorter than the timeout value of the message.

31. The non-transitory computer-readable media of claim 23, wherein the length of each of the plurality of message segments is limited to a maximal segment length that decreases with an increasing ~timeout value.

32. The non-transitory computer-readable media of claim 23, wherein the timeout value determines a maximum time interval available for transmission of each message segment.

33. An apparatus for transmitting messages in a communications system, the apparatus comprising:
  first means for segmenting a message into a plurality of message segments, the plurality of message segments comprising at least one leading message segment and a trailing message segment;
  second means for applying a message segment indication to the at least one leading message segment;
  third means for assigning one of a plurality of timeout values to the message; and
  fourth means for determining the length of the message segments according to the timeout value of the message such that the message segments have a maximal segment length that decreases with an increasing timeout value of the message.

34. The apparatus of claim 33, wherein the timeout value determines a maximum time interval available for transmission of each message segment.

* * * * *